US012612298B2

(12) United States Patent
Szeteli et al.

(10) Patent No.: US 12,612,298 B2
(45) Date of Patent: Apr. 28, 2026

(54) BOREHOLE

(71) Applicant: AS Strömungstechnik GmbH, Ostfildern (DE)

(72) Inventors: Andreas Szeteli, Filderstadt (DE); Nico Fischer, Stuttgart (DE)

(73) Assignee: AS Stroemungstechnik GmbH, Ostfildern (DE)

( * ) Notice: Subject to any disclaimer, the term of this patent is extended or adjusted under 35 U.S.C. 154(b) by 321 days.

(21) Appl. No.: 18/232,372

(22) Filed: Aug. 10, 2023

(65) Prior Publication Data

US 2024/0059547 A1 Feb. 22, 2024

(30) Foreign Application Priority Data

Aug. 17, 2022 (DE) ......................... 102022120753.6

(51) Int. Cl.

*B67D 7/02* (2010.01)
*B05B 11/00* (2023.01)
*B05B 15/30* (2018.01)
*B67D 1/08* (2006.01)

(52) U.S. Cl.

CPC ........ *B67D 7/0288* (2013.01); *B05B 11/0008* (2013.01); *B05B 15/30* (2018.02); *B67D 7/0294* (2013.01); *B67D 2001/0825* (2013.01)

(58) Field of Classification Search

CPC ................ B67D 7/0288; B67D 7/0294; B67D 2001/0825; B05B 15/30; B05B 11/0008
See application file for complete search history.

(56) References Cited

U.S. PATENT DOCUMENTS 3,430,820 A * 3/1969 Spencer ................. B65D 83/34 137/636.4
3,866,626 A * 2/1975 Johnston ............. B67D 1/0831 141/54
9,828,232 B2 * 11/2017 Szeteli ................... B67D 7/221
2015/0068623 A1 * 3/2015 Szeteli ................. B67D 3/0064 137/551
2018/0209566 A1 * 7/2018 Szeteli ................. B67D 7/0294

FOREIGN PATENT DOCUMENTS

DE 102021116140 A1 12/2022

* cited by examiner

*Primary Examiner* — Jeremy Carroll
(74) *Attorney, Agent, or Firm* — Von Rohrscheidt Patents

(57) ABSTRACT

A dispensing system (1) for a container (2) having a dip tube (5) and designed to hold a liquid (3), with a dispense head (4) which can be fastened to the dip tube (5). Via the dip tube (5) and the dispense head (4), the liquid (3) can be dispensed from the container (2) or liquid (3) can be supplied to the container (2). At least one ventilation opening (18) in the form of an elongated hole is provided in the dip tube (5).

13 Claims, 4 Drawing Sheets

BOREHOLE

CROSS REFERENCE TO RELATED APPLICATIONS

This application claims the priority of DE 102022120753.6 filed on 2022 Aug. 17; this application is incorporated by reference herein in its entirety.

BACKGROUND

The invention relates to a dispensing system according to the preamble of claim 1.

Such a dispensing system is known from DE 10 2021 116 140. This dispensing system is used for filling and draining containers, particularly barrels, filled with liquid chemicals. The dispensing system comprises a dispense head, which can be fastened to a dip tube of a container. By means of the dispense head, via the dip tube, liquid can be dispensed from the container or liquid can be supplied to the container. By a displacement movement the dispense head can be fixed in a fastened position on the dip tube. The fastened position can be controlled by means of an optical sensor to achieve a target position of the dispense head on the dip tube.

Alternatively, the dispense head can be screwed to the dip tube.

In general, the dispense head with the dip tube constitutes a liquid channel when the dispense head is connected in the fastened position to the dip tube. Via the liquid channel, liquid is dispensed from the container or is supplied to the container.

Sufficient ventilation of the container is necessary to achieve sufficiently high flow rates when filling or draining the container, i.e., a gas exchange must take place between the inner chamber of the container and the environment.

For this purpose, a circular ventilation opening is provided in the dip tube in known dispensing systems. However, due to design considerations, the diameter of the ventilation opening cannot be chosen arbitrarily large. Non-optimal ventilation of the container results due to the limited diameter of the circular borehole, which has the consequence that the flow rates when filling or draining the container are unsatisfactory.

SUMMARY

The invention relates to a dispensing system (1) for a container (2) having a dip tube (5) and designed to hold a liquid (3), with a dispense head (4) which can be fastened to the dip tube (5). Via the dip tube (5) and the dispense head (4), the liquid (3) can be dispensed from the container (2) or liquid (3) can be supplied to the container (2). At least one ventilation opening (18) in the form of an elongated hole is provided in the dip tube (5).

DETAILED DESCRIPTION

The invention seeks to solve the problem of providing a dispensing system that enables efficient filling or draining of containers.

The features of claim 1 are provided to solve this problem. Advantageous embodiments and appropriate further developments of the invention are described in the dependent claims.

The invention relates to a dispensing system for a container having a dip tube and designed to hold a liquid, with a dispense head which can be fastened to the dip tube. Via the dip tube and the dispense head, the liquid can be dispensed from the container or liquid can be supplied to the container. At least one ventilation opening in the form of an elongated hole is provided in the dip tube.

The elongated hole shape of the or each, ventilation opening allows their size to be significantly increased compared to known circular ventilation openings, without increasing the height of the ventilation opening, i.e., its extension in the longitudinal direction of the dip tube.

By this, the ventilation of the container for its filling with liquid or for its drainage is significantly improved in a surprisingly simple manner.

This results in an efficient pressure equalization between the pressure in the container and the ambient pressure of the environment. High flow rates for the filling and drainage of the containers can be achieved thereby. The ventilation openings constituted as elongated holes can be integrated into the design of the dip tube and of the dispense head without impairing these.

According to an advantageous embodiment, two elongated holes disposed opposite one another are provided on the dip tube.

It is appropriate for the elongated holes to be constituted identically.

The two elongated holes disposed opposite one another increase the gas exchange between the container inner chamber and the outer environment without impairing the design and stability of the dip tube.

Especially advantageously, the longitudinal axis of the, or each, elongated hole runs perpendicular to the longitudinal axis of the dip tube.

The longitudinal axis of the elongated hole(s) does not have to run exactly perpendicular to the longitudinal axis of the dip tube, i.e., it is sufficient for it to run transverse to the longitudinal axis of the dip tube.

This constitution of the ventilation opening ensures that this has a smaller extension in the longitudinal direction of the dip tube and nevertheless is constituted to have a large surface area in order to ensure good ventilation of the container.

According to an advantageous embodiment, the dip tube is made of plastic.

In particular, the dip tube is an injection-molded plastic part.

Therefore, the dip tube can be produced efficiently and cost-effectively in high unit numbers. The ventilation openings are worked into the manufacture of the injection-molded plastic part in the injection process.

The size and number of the ventilation openings provided in the injection-molded plastic part must remain limited so as not to place at risk the stability of the injection-molded plastic part. These requirements are satisfied with the ventilation openings according to the invention in the form of elongated holes, which have a sufficiently large distance to one another, wherein nevertheless the surfaces of the ventilation openings are large enough to achieve high flow rates for filling or draining the containers.

According to an advantageous embodiment, a head piece is provided on the top of the dip tube, which head piece is mounted in a container opening in the cover of the container, wherein the dip tube runs in the vertical direction.

The, or each, ventilation opening is mounted to the head piece in the region where the dip tube opens out.

The ventilation openings are therefore located closely below the head piece. The extension of the ventilation opening in the longitudinal direction must be limited by this design restriction. These requirements are satisfied with the ventilation openings according to the invention, since their extension transverse to the longitudinal axis of the dip tube is significantly larger than in the direction of the longitudinal axis of the dip tube.

According to an advantageous embodiment, the dispense head has a tubular segment on its bottom which when the dispense head is fastened to the dip tube projects into the dip tube, wherein the walls of the dip tube and of the tubular segment delineate a liquid channel.

The liquid channel opens out at a liquid connection of the dispense head.

Furthermore, the, or each, ventilation opening constitutes an opening out of a gas channel.

The gas channel runs in the region of the dispense head and opens out at a ventilation connection of the dispense head.

Via the liquid channel, liquid is supplied for filling the container and liquid is also guided out of the container. The container is ventilated during these processes via the gas channel and therefore a pressure equalization takes place between the pressure in the container and the ambient pressure of the environment.

Efficient pressure equalization is ensured by the ventilation openings constituted as elongated holes according to the invention and by this, high flow rates are achieved in the filling or draining of the container.

Advantageously, a circumferential seal is provided on the outside of the tubular segment running in its circumferential direction, wherein when the dispense head is fastened to the dip tube, the seal lies closely beneath the, or each, ventilation opening of the dip tube.

The seal separates the gas channel from the liquid channel.

Therefore, the gas channel and the liquid channel are completely decoupled by the seal.

The distance between the seal of the dispense head and the head piece of the dip tube is relatively small. This limits the maximum extension of the ventilation opening in the longitudinal direction of the dip tube. These requirements are satisfied with the ventilation openings according to the invention since the extension of the, or each, elongated hole in the longitudinal direction of the dip tube is significantly smaller than perpendicular thereto.

BRIEF DESCRIPTION OF THE DRAWINGS

The invention is explained in the following with reference to the drawings. The drawings show.

DETAILED DESCRIPTION OF THE PREFERRED EMBODIMENTS

Figure 1:
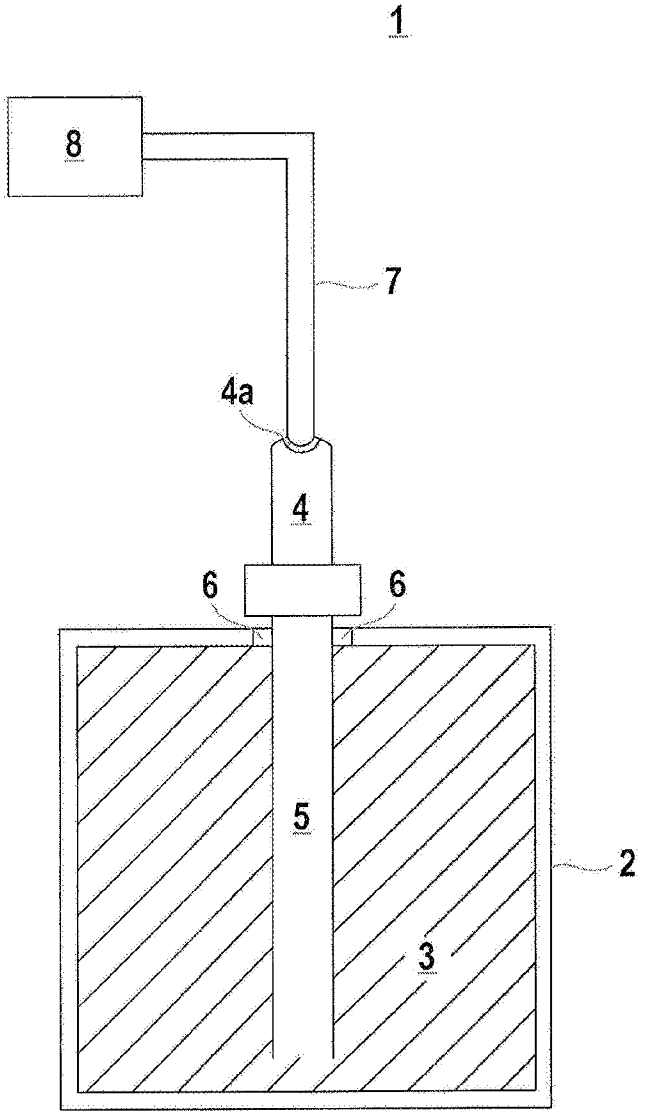
FIG. 1: Schematic depiction of the dispensing system according to the invention.

FIG. 1 shows schematically an exemplary embodiment of the dispensing system 1 according to the invention for transportable containers 2, which in particular can be barrels or similar. A liquid 3 is stored in the respective container 2. Liquids 3 stored in such containers 2 are in particular liquid specialty chemicals.

The dispensing system 1 comprises a dispense head 4, which can be fastened to a dip tube 5. The dip tube 5 is supported in a bung head 6, which is seated in a container opening of the container 2, and is thus firmly connected to the container 2. The longitudinal axis of the dip tube 5 runs in a vertical direction.

The dispense head 4 is used for dispensing liquids 3 from the container 2. The dispense head 4 can also be used for filling containers 2. For this purpose, the dispense head 4 has a liquid connection 4*a* at its upper end. A line 7 that leads to a pump 8 is connected to this liquid connection 4*a*. The line 7 can be constituted in the form of a hose. The pump 8 is controlled by a control unit (not shown).

Figure 2:
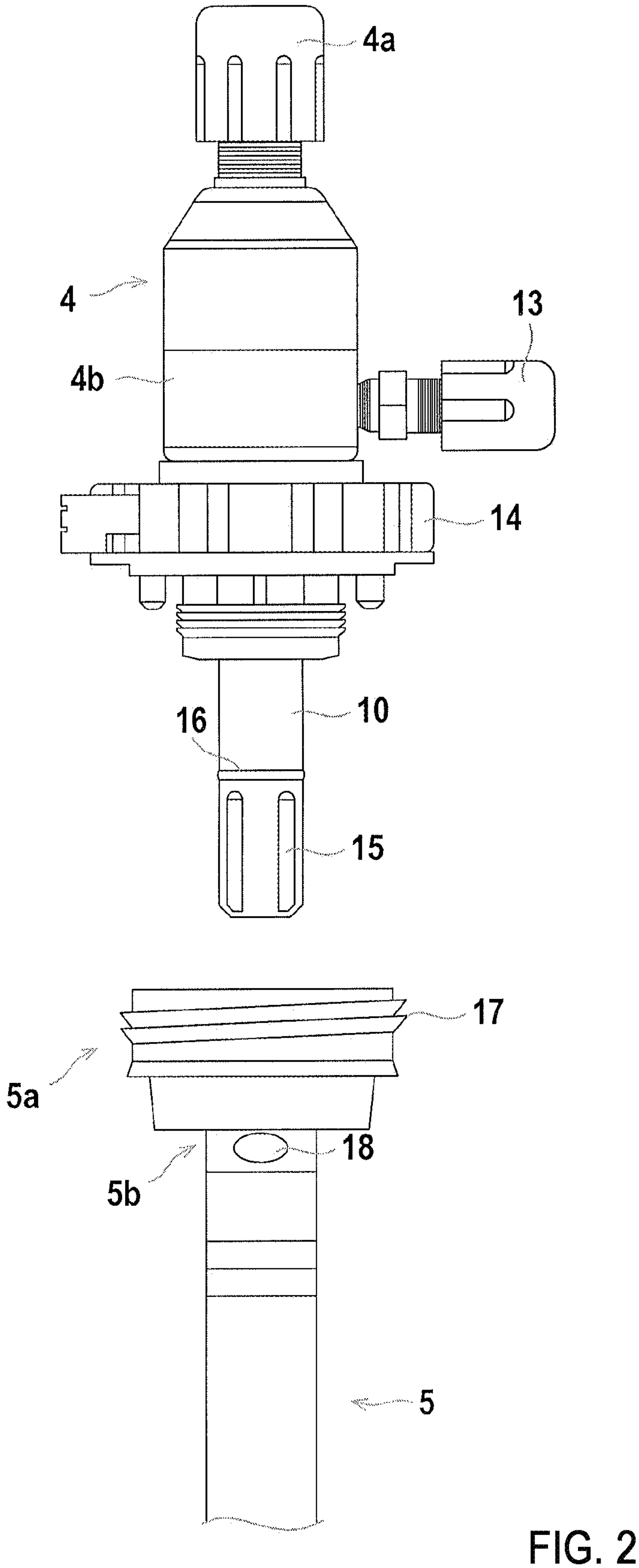
FIG. 2: Depiction of the dispense head and the dip tube of the dispensing system according to FIG. 1.
Figure 3:
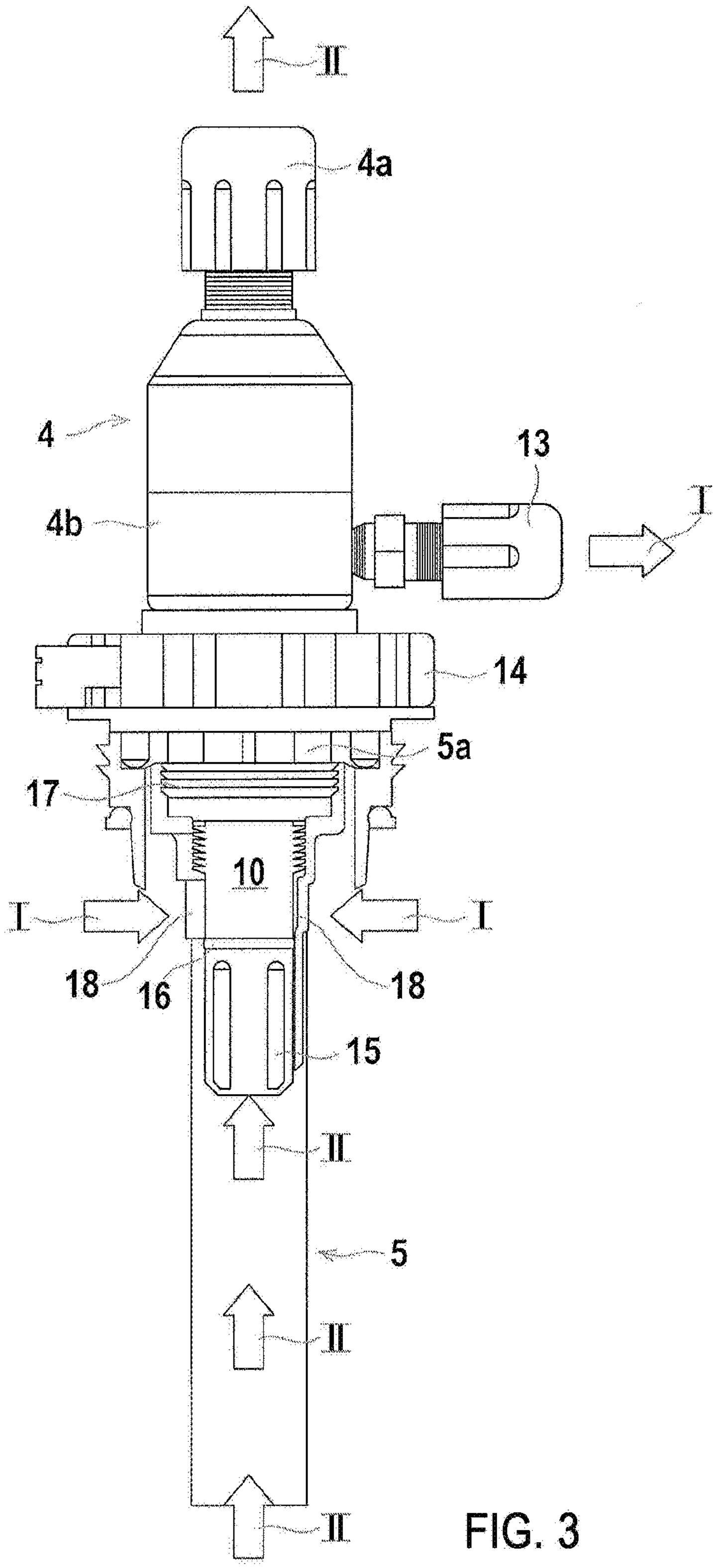
FIG. 3: Depiction of the dispense head of the dispensing system according to FIG. 1 fastened to the dip tube.
Figure 4:
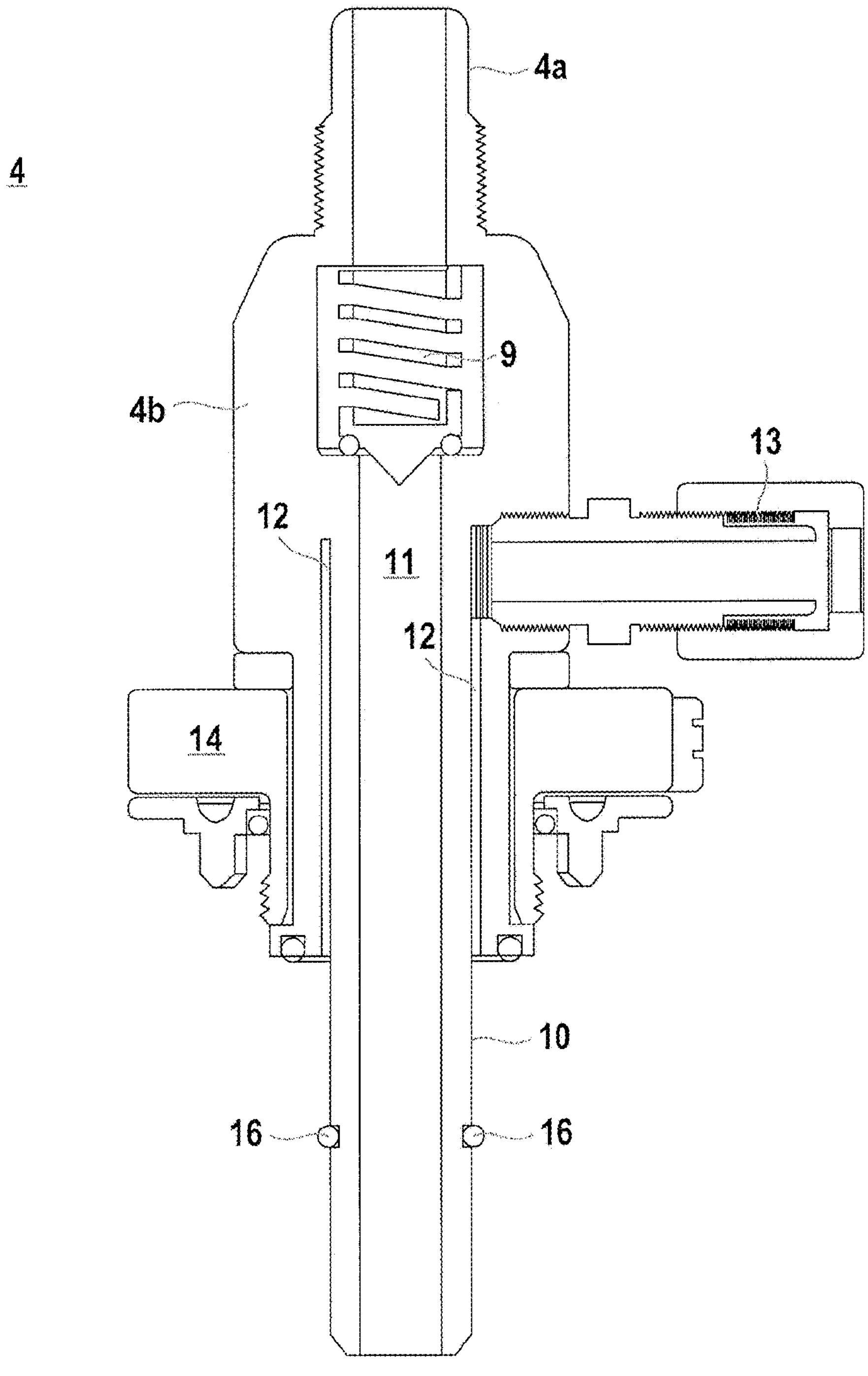
FIG. 4: Sectional view of the dispense head of the dispensing system according to FIG. 1.

FIG. 2 shows the dispense head 4 at a distance from the dip tube of the dispensing system 1 according to FIG. 1. FIG. 3 shows the dispense head 4 fastened to the dip tube. FIG. 4 shows a sectional view of the dispense head 4.

The dispense head 4 has a base body 4*b* forming a housing, at the upper end of which the liquid connection 4*a* is provided. At the lower end thereof, a check valve is connected, which connects to the top of a tubular segment 10 that opens out on the bottom of the base body 4*b*. The cavity of the tubular segment 10 forms a channel structure 11 as a component of a liquid channel for filling and draining the container 2.

A ventilation channel 12 in the base body 4*b* of the dispense head 4 runs concentric to the channel structure 11 as a component of a gas channel for ventilating the container 2 and for ensuring a pressure equalization between the pressure in the container 2 and the ambient pressure of the environment. The gas channel opens out at a ventilation connection 13.

A flange 14 is located on the outside of the gas channel for fastening the dispense head 4 to the dip tube 5.

Opening out on the lower edge of the tubular segment 10, there are depressions 15 running in its longitudinal direction. A seal that runs around in the circumferential direction of the tubular segment is provided above these depressions 15.

The dip tube 5 is made of plastic and is advantageously constituted as an injection-molded plastic part.

The dip tube 5 essentially consists of a hollow-cylindrical tube body, the inner wall of which is a component of the liquid channel. A head piece 5*a* is present on the top of the dip tube 5, which head piece 5*a* is preferably constituted as a single piece with the tube body. The head piece 5*a* has an outer thread 17 for fastening in the container opening of the container 2.

According to the invention, there are two identically constituted ventilation openings 18 disposed opposite one another in the dip tube 5.

The ventilation openings 18 are constituted in the shape of elongated holes. The longitudinal axes of the elongated holes run perpendicular to the longitudinal axis of the dip tube 5. Since the longitudinal axis of the dip tube 5 runs in a vertical direction, the longitudinal axes of the elongated holes run in a horizontal direction. The extension of each elongated hole in its longitudinal direction is significantly larger, advantageously at least 2 to 3 times larger, than the extension of the elongated hole in a vertical direction.

The ventilation openings 18 are located closely beneath the head piece 5*a* of the dip tube 5, i.e., the ventilation openings 18 are located in the opening-out region where the dip tube 5 opens out at the head piece 5*a*.

FIG. 3 shows the dispense head 4 fastened to the dip tube 5. The ventilation openings 18 then lie closely above the seal 16. The ventilation openings 18 lie in the intermediate space between the head piece 5*a* and the seal 16. The heights, i.e., extensions, of the ventilation openings 18 in the longitudinal direction of the dip tube 5 are adapted to the free part of the intermediate space present there. Since the ventilation openings 18 are constituted as elongated holes and their extensions transverse to the longitudinal axis are larger than in the longitudinal direction of the dip tube 5, both elongated holes have cross-sections optimally sized to allow a largest-possible throughput of gas, in particular air, in the container 2. The extensions of the elongated holes transverse to the longitudinal axis of the dip tube 5 are significantly smaller than the circumference of the dip tube 5. There is thus sufficient wall material of the dip tube 5 present between the elongated holes such that its stability is not impaired by the elongated holes.

Toward the interior space of the container, the ventilation openings 18 delineate the gas channel, which leads to the gas channel via the ventilation channel 12. Due to the maximized cross-sections of the ventilation openings 18, an efficient pressure equalization between the pressure in the container 2 and the ambient pressure of the environment is enabled via the gas channel. The flow direction of the gas is marked in FIG. 3 with the arrows I.

In FIG. 3, the arrows II further depict the liquid flow when draining liquid 3 via the liquid channel. Liquid 3 in the container 2 flows into the dip tube 5 via its open bottom, and is guided via the channel structure 11 of the dispense head 4 to the liquid connection and poured out there.

The gas flow in the gas channel is separated from the liquid flow in the liquid channel by means of the seal 16.

LIST OF REFERENCE NUMERALS (1) dispensing system
(2) container
(3) liquid
(4) dispense head
(4*a*) liquid connection
(4*b*) base body
(5) dip tube
(5*a*) head piece
(6) bung head
(7) line
(8) pump
(9) check valve
(10) tubular segment
(11) channel structure
(12) ventilation channel
(13) ventilation connection
(14) flange
(15) depression
(16) seal
(17) outer thread
(18) ventilation opening

The invention claimed is:

1. A dispensing system of a container configured to hold a liquid, the dispensing system comprising:
- a dip tube;
- a dispense head fastened at the dip tube, so that the liquid is dispensable from the container through the dip tube and the liquid is supplyable to the container through the dip tube,
- wherein at least one ventilation opening configured as an elongated hole is present in the dip tube,
- wherein a head piece is provided at a top end of the dip tube and mounted in a container opening in a bung head of the container, wherein the dip tube runs in a vertical direction, and
- wherein at least one ventilation opening is arranged in the dip tube directly adjacent to the head piece and permanently connected to ambient when the liquid is dispensed from the container through the dip tube and when the liquid is supplied to the container through the dip tube.

2. The dispensing system according to claim 1, wherein the at least one ventilation opening includes two elongated holes disposed opposite one another in the dip tube.

3. The dispensing system according to claim 2, wherein the two elongated holes are configured identical.

4. The dispensing system according to claim 1, wherein longitudinal axes of the elongated holes run transversal to a longitudinal axis of the dip tube.

5. The dispensing system (1) according to claim 4, wherein the longitudinal axes of the elongated holes run perpendicular to the longitudinal axis of the dip tube.

6. The dispensing system according to claim 1, characterized in that the dip tube is made from plastic.

7. The dispensing system according to claim 6, wherein the dip tube is an injection-molded plastic part.

8. The dispensing system according to claim 1,
- wherein the dispense head has a tubular segment on its bottom end,
- wherein the tubular segment extends into the dip tube when the dispense head is fastened to the dip tube,
- wherein walls of the dip tube and of the tubular segment define a liquid channel.

9. The dispensing system according to claim 8, wherein the liquid channel leads into a liquid connection of the dispense head.

10. The dispensing system according to claim 8,
- wherein a circumferential seal is provided on an outside of the tubular segment running in its circumferential direction,
- wherein the circumferential seal is arranged closely below the at least one ventilation opening when the dispense head is fastened at the dip tube when the liquid is dispensed from the container through the dip tube.

11. The dispensing system according to claim 10, wherein the circumferential seal separates a gas channel from the liquid channel.

12. The dispensing system according to claim 1, wherein the at least one ventilation opening forms an outlet opening of a gas channel.

13. The dispensing system according to claim 12, wherein the gas channel runs inside the dispense head and leads into a ventilation connection of the dispense head.

* * * * *